(12) United States Patent
Urbanski et al.

(10) Patent No.: US 7,813,958 B1
(45) Date of Patent: Oct. 12, 2010

(54) METHOD, SYSTEM, AND SOFTWARE FOR GEOGRAPHICALLY FOCUSED NETWORK ADVERTISING

(75) Inventors: Michael William Urbanski, Annapolis, MD (US); Charles David Dent, Annapolis, MD (US)

(73) Assignee: Heavy Hammer, Inc., Annapolis, MD (US)

( * ) Notice: Subject to any disclaimer, the term of this patent is extended or adjusted under 35 U.S.C. 154(b) by 1880 days.

(21) Appl. No.: 09/714,665

(22) Filed: Nov. 17, 2000

Related U.S. Application Data

(60) Provisional application No. 60/165,943, filed on Nov. 17, 1999.

(51) Int. Cl.
*G06Q 30/00* (2006.01)

(52) U.S. Cl. .............. 705/14.49; 705/14.54; 705/14.55; 705/14.57; 705/14.58; 705/14.63; 705/14.64

(58) Field of Classification Search .................. 705/14, 705/37, 14.49, 14.54, 14.55, 14.57, 14.58, 705/14.63, 14.64
See application file for complete search history.

(56) References Cited

U.S. PATENT DOCUMENTS

| | | | |
|---|---|---|---|
| 5,155,591 A * | 10/1992 | Wachob | 725/35 |
| 5,432,542 A * | 7/1995 | Thibadeau et al. | 725/35 |
| 5,754,939 A | 5/1998 | Herz et al. | |
| 5,948,040 A * | 9/1999 | DeLorme et al. | 701/201 |
| 5,948,061 A | 9/1999 | Merriman et al. | |
| 6,091,956 A | 7/2000 | Hollenberg | |
| 6,253,189 B1 * | 6/2001 | Feezell et al. | 705/14 |
| 6,285,987 B1 * | 9/2001 | Roth et al. | 705/27 |
| 6,285,999 B1 | 9/2001 | Page | |
| 6,298,351 B1 | 10/2001 | Castelli et al. | |
| 6,321,158 B1 * | 11/2001 | DeLorme et al. | 701/201 |
| 6,332,127 B1 | 12/2001 | Bandera et al. | |
| 6,343,317 B1 | 1/2002 | Glorikian | |
| 6,381,465 B1 | 4/2002 | Chern et al. | |
| 6,460,034 B1 | 10/2002 | Wical | |
| 6,487,538 B1 * | 11/2002 | Gupta et al. | 705/14.66 |
| 6,505,046 B1 | 1/2003 | Baker | |
| 6,522,875 B1 | 2/2003 | Dowling et al. | |

(Continued)

FOREIGN PATENT DOCUMENTS

| | | |
|---|---|---|
| JP | 2000-020433 | 1/2000 |
| KR | 2002-0028145 | 4/2002 |
| WO | WO 00/54201 | 9/2000 |

OTHER PUBLICATIONS

Definitions of "determine" and "generate", Merriam-Webster's Online Dictionary, accessed at http://www.search.eb.com/dictionary, Sep. 6, 2004.*

(Continued)

*Primary Examiner*—Donald L Champagne
(74) *Attorney, Agent, or Firm*—Ronald E. Prass, Jr.; Prass LLP

(57) ABSTRACT

A software based system and method of displaying location based information from an information site on a network by determining location data of a user of the location based information on the network. The location based information is generated based on the determined location data of the user; and generated location based information is provided to the user over the network.

56 Claims, 4 Drawing Sheets

U.S. PATENT DOCUMENTS

| | | | |
|---|---|---|---|
| 6,587,835 | B1 | 7/2003 | Treyz et al. |
| 6,625,456 | B1 | 9/2003 | Busso et al. |
| 6,735,569 | B1 * | 5/2004 | Wizig .............................. 705/4 |
| 6,757,740 | B1 * | 6/2004 | Parekh et al. ............... 709/245 |
| 6,898,571 | B1 | 5/2005 | Val et al. |
| 7,047,242 | B1 | 5/2006 | Ponte |
| 7,668,832 | B2 | 2/2010 | Yeh et al. |
| 7,680,796 | B2 | 3/2010 | Yeh et al. |
| 2002/0044067 | A1 | 4/2002 | Ilcisin |

OTHER PUBLICATIONS

"Foreclosure Research", two sheets downloaded Jan. 17, 2008 from http://web.archive.org/web/*/http://www.foreclosuresearch.com.*

Squires, Chase, "Newsletter helps investors cash in", St. Petersburg Times, Pasco Times Section, p. 8, Aug. 23, 1998.*

Definition of "sponsor" (n), Merriam-Webster's Collegiate® Dictionary, 10th ed. (Springfield MA: Merriam Webster), 1997.*

"foreclosurelistings", web pages downloaded from http://web.archive.org/web/*/http://foreclosurelistings.com on Aug. 9, 2008.*

Riedman, Patricia, "Search engine startup to auction listings", Advertising Age, Feb. 23, 1998.*

PC Magazine Online, two pages published May 8, 1999.*

Sullivan, Danny, "AltaVista Launches Paid Listings", Search Engine Watch, May 4, 1999.*

Cheverst et al., "Experiences of Developing and Deploying a Context-Aware Tourist Guide: The Guide Project," ACM Press, pp. 20-30 (2000).

Cheverst et al., "Developing a Context-aware Electronic Tourist Guide: Some Issues and Experiences," ACM Press, pp. 1-8, (2000).

Long et al., "Rapid Prototyping of Mobile Context-Aware Applications: The Cyberguide Case Study," ACM Press, pp. 97-107 (1996).

The Gale Group, "Dollars and Eyeballs: The Net Advertising Equation," *Publ. Techn. Review*, vol. 3, No. 10, 4 pgs. (1996).

Gallagher et al., "A Framework for Targeting Banner Advertising on the Internet," *Proc. of the Thirteenth Hawaii Int'l Conf. on Sys. Sci.*, vol. 4, No. 7, pp. 265-274 (1997).

Gwertzman, "Autonomous Replication in Wide-Area Internetworks," *Center for Research in Computing Techn., Harvard Univ.*, 3 pgs. (1995). [Abstract].

Bunn, "Machine Age, E-lectioneering," *The Village Voice*, vol. XLIII, No. 17, 3 pgs. (1998).

Clark, "DoubleClick Localizes Web Ads," *CNET* News.com, 2 pgs. (1998).

NetGravity AdServer AdMaster's Guide, pp. 1-59 (1999).

NetGravity AdServer User Assistance Guide, pp. 1-329 (1998).

NetGravity AdServer 3.5 Announcement, 3 pgs., (1998).

Office Action cited in U.S. Appl. No. 10/654,265 dated May 9, 2006, 10 pages.

Office Action cited in U.S. Appl. No. 10/654,265 dated Jan. 4, 2007, 11 pages.

Office Action cited in U.S. Appl. No. 10/654,265 dated Aug. 24, 2007, 9 pages.

Office Action cited in U.S. Appl. No. 10/654,265 dated May 12, 2008, 21 pages.

* cited by examiner

METHOD, SYSTEM, AND SOFTWARE FOR GEOGRAPHICALLY FOCUSED NETWORK ADVERTISING

CROSS-REFERENCE TO RELATED APPLICATION(S)

This application claims the benefit of priority under 35 U.S.C. §119(e) of provisional application Ser. No. 60/165,943, entitled "Geographically Focused Networked Advertising System," filed on Nov. 17, 1999, the disclosure which is incorporated herein in its entirety.

BACKGROUND OF THE INVENTION

1. Field of the Invention

This invention relates generally to the field of a software based system and method that provides useful and tailored location based information to a user interested in a particular subject area, and more particularly, to a software based system and method that automatically determines location data of a user to generate and display the location based information to the user.

2. Background of the Related Art

One of the problems of an information site on the Internet or other similar widely accessible public or private network (or internet-work) is that the information that is relevant to one user at one location may not be relevant to another user at another location. For example, information relating to repair personnel is relevant only to a relatively local area because repair personnel in other areas cannot conveniently respond to the repair needs of people in other areas that are not within easy travelling distance.

Therefore, the boundary-less nature of a widely accessible network, like the Internet, creates a problem for providing services that are necessarily or advantageously only provided on a regional or location based basis. Other examples of such location specific services includes professional services, such as, lawyers, doctors, veterinarians, and real estate professionals, who are licensed by jurisdiction, and as such, can only provide services within the jurisdictions in which they are authorized or licensed. Furthermore, even where a service provider may be authorized in a relatively large jurisdiction, they may effectively provide services in only a much smaller area of their jurisdiction. For example, real estate professionals often specialize in real estate transactions in a small area or locality even if they are licensed to practice in a larger jurisdiction. Other examples include delivery companies, such as local food or grocery delivery service companies that may be able to provide delivery services of goods only in a specific location or area.

Furthermore, there is a need for the location information to be particularized based on subject areas that may be of interest to a user. Therefore, in a particular location, a user may only be interested in information that relates to one or more subject areas. Since, an information site on a widely accessible network, like the Internet, potentially provides information to any user that can access the Internet, there is a need for a system that provides location based information tailored to the location of a particular user (or a communication device used by the user) and also limited or sorted by the subject areas of interest to the user.

In addition, the providers of information on an information site on a widely accessed network, such as the Internet, need the opportunity to tailor their content and advertisements to users in a particular location and/or related to a particular subject area. Accordingly, there is a need for a system that effectively provides location based advertising and content based on a location of a user that accesses the advertising and content. Furthermore, there is a need for a system that allows a sponsor or an advertiser to better manage their expenditures based on such local usage of their content or advertising provided on a widely accessed network, such as the Internet.

SUMMARY OF THE INVENTION

Therefore, it is a general object of the invention to alleviate the problems and shortcomings identified above.

In one aspect, the present invention provides a method of displaying location based information from an information site on a network, the method including: determining location data of a user of the location based information on the network; generating location based information based on the determined location data of the user; and providing the generated location based information to the user over the network.

In one aspect of the present invention, the location based information includes location based advertising.

In another aspect of the present invention, the location based information includes location based content.

In a further aspect of the present invention, the location based advertising includes advertising related to a particular subject matter area, wherein the particular subject matter area is determined based on the user.

In another aspect, the present invention provides that the location based content includes content related to a particular subject matter area, wherein the particular subject matter area is determined based on the user.

In one aspect of the present invention, the step of determining location data includes at least one of: receiving location data input by the user, using a network address of a computing/communication device used by the user, using location data determined by the computing/communication device used by the user, using a location table for determining the location data, or receiving location data from a geographic tracking system.

In a further aspect of the present invention, the geographic tracking system includes a satellite based tracking system.

In one aspect, the present invention provides that the steps of determining location data and providing the generated location based information includes communication with a computing/communication device used by the user.

In a further aspect of the present invention, the computing/communication device includes at least one of: a personal digital assistant (PDA) or other portable device, a web browser, a cell or other wireless phone, a electronic billboard, a website, a pager, a television, a web-based television device, an internet enabled device or appliance, a health monitoring device, a kiosk displaying information related to one or more subject areas, a terminal in a library, an Internet radio application, and a job related web site.

In one aspect, the present invention provides that the subject matter areas includes at least one of: home improvement, real estate, real estate professionals, real estate foreclosures and related services, automobiles, repair facilities, delivery services, health care or veterinary professionals or facilities, and professional service providers.

An important aspect of the present invention provides that the network is the Internet.

In another aspect, the present invention provides that the location data of a user includes at least one of: country, state, county, administrative division, geographic or location coordinates, postal code, company regions, population regions, or attribute based regions.

In one aspect, the present invention provides a computer readable data storage medium having program code recorded thereon for displaying location based information from an information site on a network, the program code including: a first program code that determines location data of a user of the location based information on the network; a second program code that generates location based information based on the determined location data of the user; and a third program code that provides the generated location based information to the user over the network.

In another aspect, the present invention provides a system for displaying location based information from an information site on a network, the system including: a host device, connected to the network, that displays location based information to a user; and a server device, connected to the network, that determines location data of the host device, generates location based information based on the location data of the host device, and transmits the generated location based information for display by the host device.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

Figure 1:
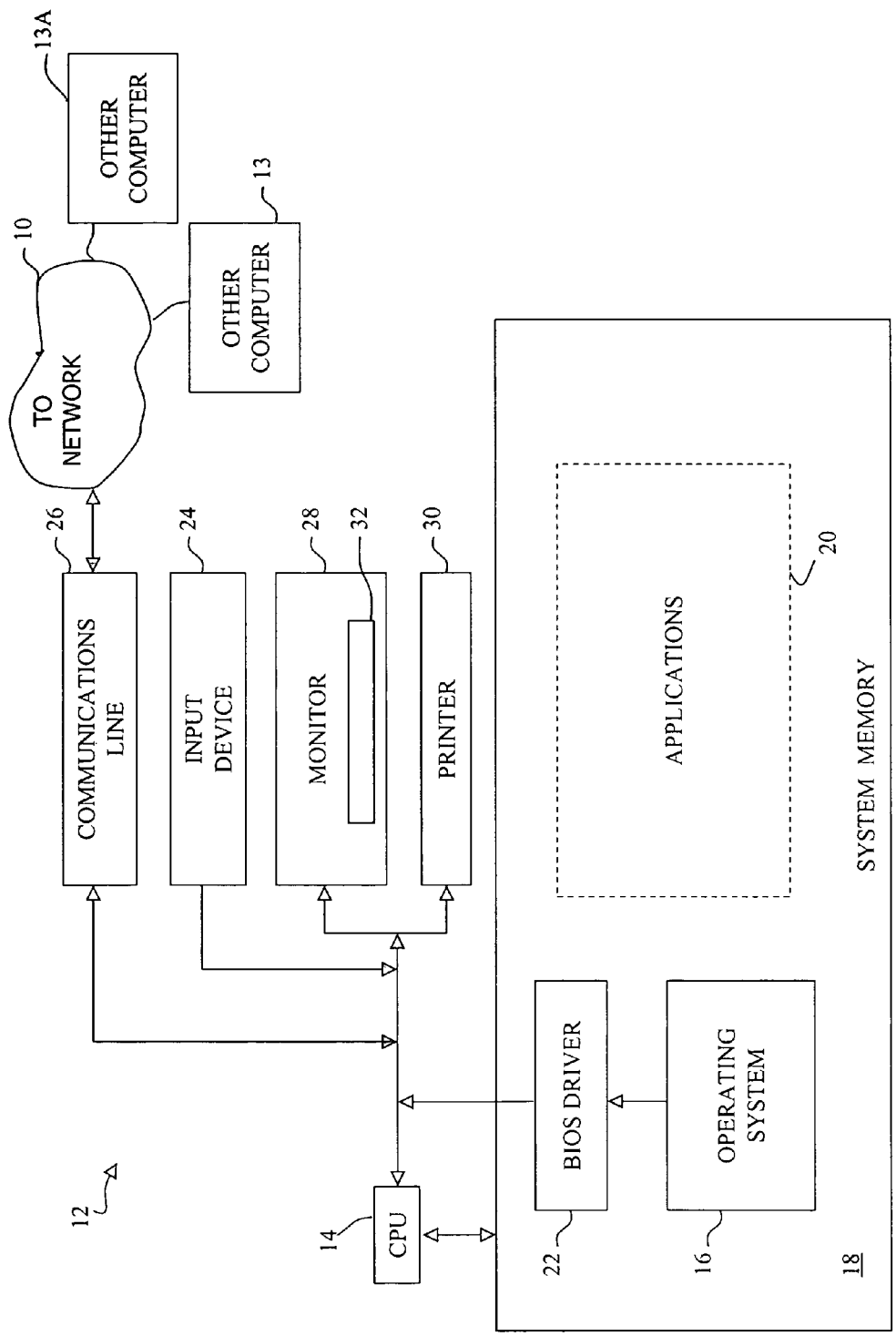
FIG. 1 is a block diagram showing the components of a general purpose computer system connected to an electronic network.

DESCRIPTION OF THE PREFERRED
EMBODIMENT(S)

In a general aspect, the present invention provides a system and method that can be used to provide useful and tailored geographically based information to a user interested in particular subject matter, while generating substantial sponsorship revenues. The information provided to the user can be sponsored or unsponsored, publicly available or proprietary content or any combination thereof.

A user first accesses a computer server (or more generically an "information site") on a public or private network, such as the Internet. Typically, the user will use a computing/communication device to communicate with the computer server. However, the present invention is not limited to any interactive computing/communication device since some embodiments of the present invention can be used by passive components such as electronic billboards or Internet appliances that themselves communicate with the server without any "interaction" with the user.

The server operated by a system operator may provide access to information on several subject areas or only on one. In the case of servers-providing information for several subject matter areas, the user will select the subject area of interest. The user will then be asked to supply geographic information (or more generically "location data") in some useful form. The invention is not limited by the form of providing the geographic information or the location data.

For example, the user could "click" on a geographic location in a displayed map, input a town, city, state or postal code, or identify the geographic location in some other manner. Indeed, the geographic information may be derived using an automated process, for example, from the user's network address or other parameters indicative of geographic location. For example, the geographic information may be pre-programmed into a computing/communication device such as an electronic billboard. Alternatively, the geographic information may be derived based on a geographic location tracking system, such as a satellite based tracking system like the GPS.

In another alternative, the user could be prompted for the geographic information first. Next subject topics appropriate to or available for that geographic area as stored in a data base are displayed for the user's selection. For example, a user may input geographic identification for Mesa, Ariz. It is to be understood that the present invention contemplates that one or more of these geographic location indicators can be used in combination.

A computer program module reads the geographic information and identifies and displays subject matter areas corresponding to the geographic information or the location data, such as, for example, home improvement, real estate, or automobiles. When the user clicks on a topic, such as the home improvement topic, he then sees a display of categories. For example, the category list displayed may include such topics as building permits, grading, carpentry, plumbing, electrical, landscaping, painting, interior design, etc. The categories may be sponsored exclusively by a particular supplier of goods and services, as a way of directing the user to that supplier. For example, a provider of permitting services may sponsor the building permits subcategory of this home improvement information site for Mesa, Ariz. The permitting services provider then provides content in the form of original or licensed content. For example, the permitting services provider may display planning and zoning maps licensed from a map maker. The permitting services provider may also choose to include links to county regulations for the user's review. The permitting services provider could also include original content. For example, text or charts relating to specific requirements and regulations in the geographic region. As the exclusive sponsor for the region, the permitting services provider would also try to direct customers to use his services.

Similarly the electrical category may include separately sponsored sub-categories for electrical contractors, parts suppliers, lamp and lighting supplies, etc. The sponsor of each subcategory provides content and links. For example, the electrical contractor sponsor may provide information about specific local requirements in this region and links to corresponding local regulations. The lamp and lighting sponsor may provide product information and links to manufacturer sites.

Throughout this process an exclusive sponsor for each category or sub-category in the geographic regions corresponding to the region identified for the user provides general information and information unique to that region. For example, geographic regions with miles of ecologically sensitive waterfront may have zoning regulations very different from those in an industrial area or in the plains states. Thus, a system according to the invention includes a server computer that is programmed to capture the user's geographic information and to access a data base of information available for the region identified for the user. For each region, the data base identifies information categories. Each category in that region may have an exclusive sponsor or may be broken down further into sub-categories, with each subcategory having an exclusive sponsor for that region. The exclusive sponsors provide content and links appropriate for that category in that region. The sponsorship may be for any convenient length of time, e.g. a day, week, month, quarter or year. Throughout this process the system operator may display a frame and its own advertising around the information provided by the exclusive sponsor of a particular subject for a particular region.

Geographic regions may be tailored to local circumstances. For example, a heavily populated metropolitan area such as New York may have more geographic regions than a physically larger area in a sparsely populated area of Wyoming. With a large number of regions and a large number of categories and sub-categories available for sponsorship in each region, there are multiple opportunities for the system operator to generate revenue.

With reference to the figures, FIG. 1 is a block diagram showing the components of a general purpose computer system 12 connected to an electronic network 10, such as a computer network. The electronic (or computer) network 10 can also be a public network, such as the Internet or Metropolitan Area Network (MAN), or other private network, such as a corporate Local Area Network (LAN) or Wide Area Network (WAN), or a virtual private network. As shown in the FIG. 1, the computer system 12 includes a central processing unit (CPU) 14 connected to a system memory 18. The system memory 18 typically contains an operating system 16, a BIOS driver 22, and application programs 20. In addition, the computer system 12 contains input devices 24 such as a mouse and a keyboard 32, and output devices such as a printer 30 and a display monitor 28.

The computer system generally includes a communications interface 26, such as an ethernet card, to communicate to the electronic network 10. Other computer systems 13 and 13A also connect to the electronic network 10. One of skill in the art would recognize that the above system describes the typical components of a computer system connected to an electronic network. It should be appreciated that many other similar configurations are within the abilities of one skilled in the art and all of these configurations could be used with the methods and systems of the present invention. Furthermore, it should be recognized that the computer system and network disclosed herein can be programmed and configured as computing or information sites (such as the server device or the computing/communication device discussed herein), by one skilled in the art, to implement the method and system discussed further herein.

Figure 2:
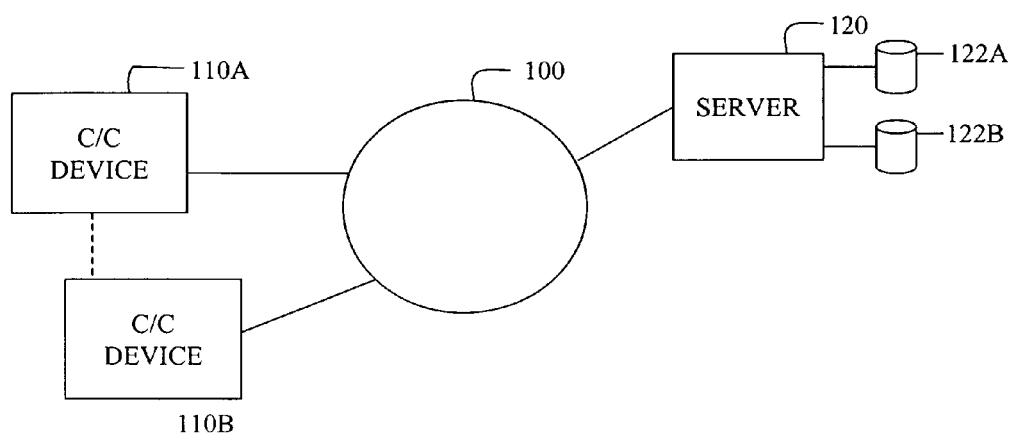
FIG. 2 is a block diagram showing the high level system components of the present invention.

FIG. 2 is a block diagram showing the high level system components of a preferred embodiment of the present invention. One or more computing/communication devices (110A, 110B) connect to a server device 120 through an electronic network 100. The computing/communication device 110A typically allows a user to communicate with an information site provided by the server device 120. For example, the computing/communication device 110A allows the user to interact with the information site provided the server device 120 by allowing user input and transmitting information, for example, location data, to the server device 120. The computing/communication device 110A also receives information from the server device 120 and presents the information to the user. The information can be provided to the user as visual output (a display device) or other sensory output (audio, multimedia, etc) can also be provided.

Examples of the computing/communication device 110A include a personal digital assistant (PDA) or other portable device, a web browser, a cell or other wireless phone, a electronic billboard, a website, a pager, a television, a web-based television device, an internet enabled device or appliance, a health monitoring device, a kiosk displaying information related to one or more subject areas, a terminal in a library, an Internet radio application, and a job related web site.

Therefore, in one aspect, the present invention contemplates that the computing/communication device need not only be an "interactive" device that interacts with a user. It could also be a "passive" device, such an electronic billboard or an Internet appliance that displays information, and the device is already programmed with its location data that can be communicated to the server device 120. Alternatively, the electronic billboard can communicate with a location tracking service (such as a satellite based tracking system like the GPS) which generates the location data that is communicated to the server device 120 either directly by the location tracking service or through the electronic billboard.

The electronic network 100 is any communication network that allows one or more computing/communication devices 110A to communicate with a server device 120. The "electronic" network may in fact be an all-optical network or a combination of an optical and electronic network as would be understood by those skilled in the art. The electronic network 100 may be a public network like the Internet, a virtual private network, or a private network like a corporate local area network (LAN) or wide area network (WAN).

The server device 120 is typically a computing system that includes programmed application and system software and hardware and includes logical database 122A that stores "location data" related information and database 122B that stores location based information (advertisement and/or content) that is correlated to the location data stored in the location data database 122A. That is, the location data database 122A enables the server device to meaningfully interpret the location data sent by a user. Once the location data has been interpreted, the location data is used to retrieve the appropriate location based information (advertisement and/or content) from the location based information database 122B. As discussed earlier, in the preferred embodiment, the location data relates to geographical location data and the location based information provides advertisements and/or content that is appropriate for a particular geographical location.

Figure 3:
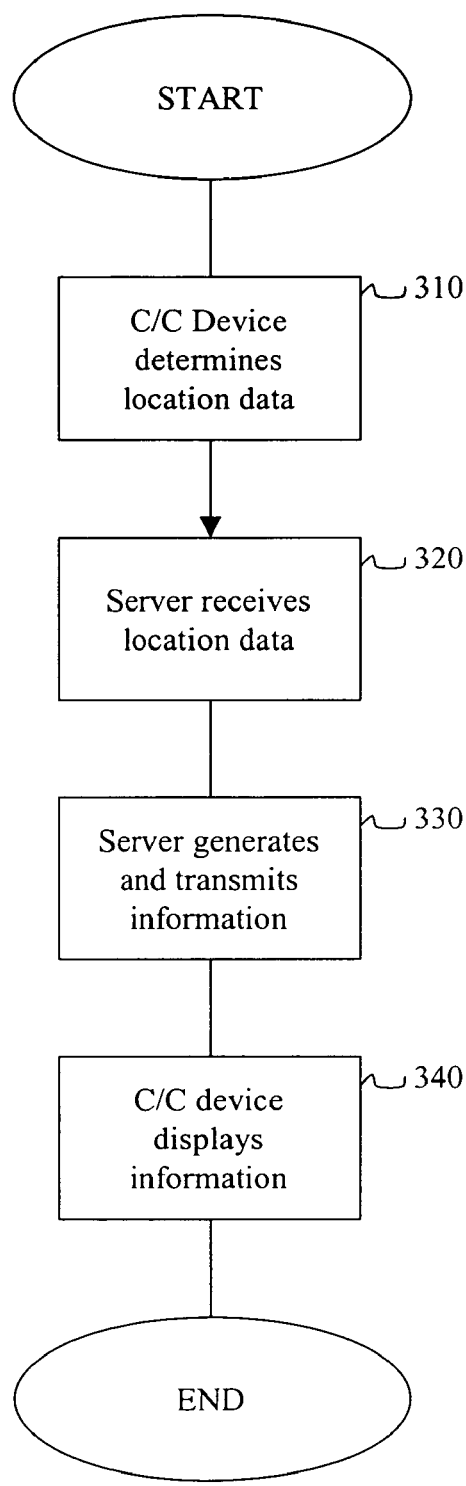
FIG. 3 is a flow diagram showing the high level process steps of the present invention.

FIG. 3 is a flow diagram showing the high level process steps of the present invention. In step 310, the computing/communication device 110A determines location data indicative of a location of a user using the device 110A. The computing/communication device 110A may be programmed to interactively retrieve the location data from a user, for example, by presenting a geographical map or a menu to a user and recording the user's response. Alternatively, the computing/communication device 110A may be preprogrammed with its location data or the location data may be stored on the device as a file. Alternatively, a network address of the device may be used as its location data. In another embodiment, the location data may be derived using a location table that can be changed or modified. In yet another embodiment, the location data may be derived by the computing/communication device 110A communicating with a location tracking service, such as a GPS system. In such an embodiment, the location data may de directly transmitted to the server device 120 from the location tracking service or the location data may be returned to the computing/communication device 110A for transmission to the server device 120.

In step 320, the server device 120 receives the location data indicative of the location of the computing/communication device 110A. In one embodiment, the server device 120 uses a location data database 122A to interpret the location data received from a computing/communication device 110A. For example, the server device 120 may use a table stored in the database 122A to identify the location of the user based on the received location data.

Thereafter, in step 330, the server device 120 generates the location based information using, for example, a location information database 122B. The location information can include advertisement and/or content that is keyed to the location data either directly or through its interpretation using the location data database 122A. The location based information is then transmitted to the computing/communication device 110A so that the device 110A displays or presents the received location based information in step 340. It should be understood that the location based information can be presented either visually (by a display device) or using multimedia devices that present the information using audio, video, or any other display technologies.

One of skill in the art would recognize that other system configurations and data structures could be provided to implement the functionality of the present invention. All such configurations and data structures are considered to be within the scope of the present invention.

One of skill in the art would recognized that the server device 120 refers to a logically centralized system that receives and transmits messages from one or more computing/communication devices (110A, 110B). One skilled in the art would recognize that such a logically centralized system could easily be implemented using a physically distributed system in which one or more processors and databases are connected over a computerized network, and suitable hardware and programmed software is provided to coordinate the processors, databases, and networks to provide the functionalities disclosed herein with respect to the server device 120. Likewise, it should be recognized that the databases 122A and 122B are logically separate. Physically, they could be implemented using one database file that implements separate data structures, such as, separate tables:

In this context, it is also to be understood that the present invention utilizes known security measures for transmission of electronic data across networks. Therefore, encryption, authentication, verification, and other security measures for transmission of electronic data across both public and private networks are provided using techniques that are well known to those skilled in the art.

In one alternate embodiment of the present invention, the C/C device 110A provides contextual information to the server device 120 so that the server device generates and transmits information to the server device that is correlated to the contextual information provided by the C/C device 110A. Examples of such contextual information includes, for example, some characteristic(s) of the user (age, gender, nationality, etc.), profession or vocation information of the user, type of the C/C device 110A (laptop, pager, cellular phone, electronic billboard, terminal connected to a GPS system, etc.), a subject matter of interest to the user, or any information that provides contextual information for the server device 120 to determine appropriate information (content or advertising) for transmission to the server device. One skilled in the art would recognize that additional databases and processing logic would also be needed to interpret the contextual information provided by the C/C devices and to store and/or generate information correlated to contextual information.

In alternate embodiments, the contextual information provided by the C/C device 110A can be used in combination with the location data provided by the C/C device 110A. For example, the C/C device 110A may provide the location data and the contextual information sequentially (with either one being provided first), or the location data and the contextual information can be provided simultaneously by the C/C device 110A.

One exemplary embodiment of the present invention is applied to purchasing foreclosed properties. Real estate foreclosures, and in particular residential real estate foreclosures represented $28 billion in Real Estate sales in 1998. Real Estate professionals are motivated to make up to twice the normal commissions by selling or financing a foreclosure. Homebuyers reap the benefit of reducing their closing costs substantially and the promise of an instant equity position.

An information site according to the present invention ("HUD Infosite") is an Internet site dedicated to serving both the public who seeks access to the information resources they need to acquire a government foreclosed home and the professionals who specialize in servicing those properties. Using the invention, the can provide a powerful new paradigm to introduce customers to the local Real Estate professionals that serve them.

The desirability of government foreclosures has created a demand regarding this lucrative niche in the U.S. Real Estate market. The sale of a federally foreclosed home is an intricate transaction that requires knowledge and diligence to complete.

Using the present invention, an informed consumer who has been exposed to the information on HUD Infosite will be encouraged to work closely with the local Real Estate professionals advertising on it because the information provided encourages them to do so.

From the sponsor's perspective the content is designed to support the Real Estate professional rather than replace their expertise. A Real Estate professional advertising on the HUD Infosite will realize more benefit as a lead generation source, rather than as a source of specific sales of foreclosed Real Estate.

A site such as HUD Infosite operating according to the present invention offers business-to-business (B-to-B) potential. Many B-to-B combinations exist. The Real Estate industry depends on building relationships with qualified professionals to handle each aspect of a real estate sale. An approach such as HUD Infosite brings together local professionals to complete their transactions.

Figure 4:
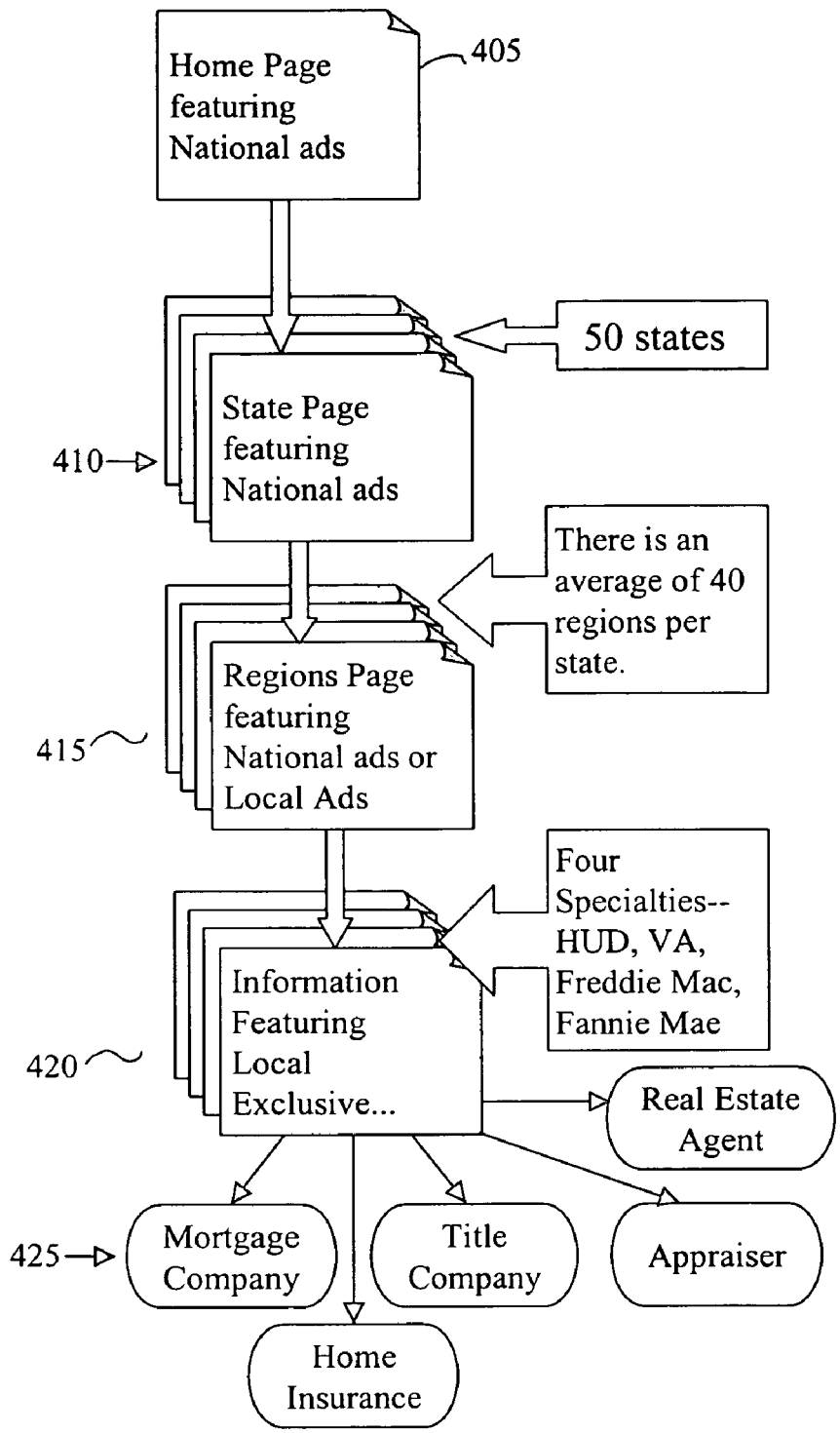
FIG. 4 is a diagram showing the stages of one embodiment of the present invention for providing real estate foreclosure related information.

With reference to FIG. 4, a HUD Infosite process according to the present invention is discussed by showing the various interactions of a user with a website embodying the HUD Infosite. In stages 405-415 (National, State, Region), users are guided to the region they are interested in while being presented with national advertisers. Their final region of choice is, preferably stored in a "cookie" for future reference.

As shown in stage 420, separating foreclosure source specialties create separate, and distinctly different, primary income streams. Real Estate professionals are able to feature one or more of these other types of foreclosures, broadening the marketing appeal to these professionals As shown in stage 425, each region features five professions forming five secondary streams of income (for example): agent, lender, insurance, title, and appraisal. Each of these exclusive Real Estate professionals has paid for the right to promote themselves exclusively within that region. Dividing the exclusive marketing opportunities by specialty and then by profession multiplies the potential income streams to 20 sources of income (four primary and five secondary streams). Multiplying those 20 streams by 2000 geographic regions creates 40,000 potential sources of income per month.

The HUD Infosite can auction off each region periodically, for example every three months. Real Estate professionals currently advertising as exclusive regional professional may have the option to either match the highest bid and maintain their exclusive regional advertiser status, or allow the bidder to assume the exclusive position. The winner will be awarded the ability to have their banner placed within premium space on the regional pages as well as gain the benefits of exclusive rights (i.e. pre-approval forms). Therefore, the HUD Infosite provides one example of a website that receives location data from a user to generate location based information (advertisements and/or content) and is able to maximize the utility for the user while maximizing the opportunities for realized targeted sponsorship revenues.

Other examples of implementations of the present invention include an Internet Service Provider or a cell phone service that provides tailored local advertisements to a user based on location data received from the users. Such services can be made free to a user if the locally tailored advertisements generate a viable revenue model.

Electronic billboards or a GPS enabled device can also tailor their information (content and/or advertisements) based on the location data transmitted to a server device such as that provided by the present invention.

Other applications of the present invention include Internet enabled devices or appliances that can display a local list of repairmen when it detects a problem in the device or appliance by communicating with a server device provided according to the present invention.

A health monitoring device may display a localized list of doctors or medical facilities based on a detected medical condition by communicating with a server device provided according to the present invention.

A terminal in a library or an information kiosk can provide localized content by transmitting location data and communicating with a server device provided according to the present invention.

Internet applications such as an Internet radio application or a job search website can provide useful localized information based on the location data received from a user.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A computer readable information storage medium having program code stored thereon that, when executed by a computer on a network, communicates information over said network comprising:
   program code to create a new first information site hosted by said computer on said network, said first information site being characterized by a new network address, said network address relating to a particular subject matter;
   program code to receive at said first information site an information request from a communications device connected through said network, said information request relating to said particular subject matter;
   program code that determines a particular geographic area for relevant information to be provided in answering said information request, wherein the particular geographic area for relevant information is determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;
   program code to retrieve answer information from one or more databases, said answer information comprising information responsive to said information request and advertiser information, said advertiser information being based on the determined particular geographic area for relevant information and containing a link to connect said communication device to the advertiser's information site relating to said particular subject matter; and
   program code to provide said answer information from said first information site to said communication device.

2. The computer readable information storage medium as recited in claim 1, wherein said advertiser information comprises sponsored information.

3. The computer readable information storage medium as recited in claim 2, wherein said sponsored information is sponsored for specific geographic locations.

4. The computer readable information storage medium as recited in claim 1, further comprising program code that determines said particular geographic area for relevant information independent of a physical location of said communication device.

5. The computer readable information storage medium as recited in claim 4, further comprising program code that determines said particular geographic area for relevant information from one of a network address identifying a geographic area of said communication device independent of a physical position of said communication device and geographic information supplied in said information request by a user of said communication device.

6. The computer readable information storage medium as recited in claim 4, wherein said geographic location of said communication device and location indicated by said geographic information provided by said user are different, and comprising program code that provides, in said answer information, information corresponding to said geographic information supplied in said information request by said user.

7. The computer readable information storage medium as recited in claim 1, further comprising program code that derives contextual information from said information request and providing in said answer advertiser information in at least one category correlated to said derived contextual information.

8. The computer readable information storage medium as recited in claim 7, further comprising program code that assigns an exclusive advertiser information provider to each category for each answer to an information request.

9. The computer readable information storage medium comprising program code as recited in claim 8, further comprising program code that assigns an exclusive advertiser information provider to each said category until an event alters the identity of said exclusive sponsor for said category.

10. The computer readable information storage medium as recited in claim 8, further comprising program code that assigns an exclusive advertiser information provider to each said category for a time period.

11. The computer readable information storage medium as recited in claim 8, further comprising program code that periodically auctions a right to be assigned as said exclusive advertiser information provider.

12. A computer readable information storage medium having program code stored thereon that, when executed by a computer, provides geographically based advertiser information to users of networked terminals, comprising:
  program code that creates a new first information site hosted by said computer on a network, said first information site being characterized by a new network address, said network address relating to a particular subject matter;
  program code that receives an information request from one of said users through a networked terminal, said information request relating to said particular subject matter;
  program code that determines a particular geographic area for relevant information for said information request, wherein the particular geographic area for relevant information is determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;
  program code that provides said user access to said first information site providing content responsive to said information request; and
  program code that provides said user a link at said first information site to an advertiser's information site, an identity of said advertiser's information site being determined based on said particular subject matter and said particular geographic area for relevant information.

13. The computer readable information storage medium as recited in claim 12, further comprising program code that provides a link to a first advertiser site for a first geographic location and a second advertiser information site for a second geographic location.

14. A computer server for communicating information over a network comprising:
  a processor that:
    creates a new first information site hosted by said computer server on said network, said first information site being characterized by a new network address, said network address relating to a particular subject matter;
    receives at said first information site an information request from a communications device connected through said network;
    determines a particular geographic area for relevant information to be provided in answering said information request, said information request relating to said particular subject matter and the particular geographic area for relevant information is determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;
    retrieves answer information from one or more databases, said answer information comprising information responsive to said information request and advertiser information, said advertiser information being based on the determined particular geographic area for relevant information and containing a link to connect said communication device to the advertiser's information site, the advertiser's information site relating to said particular subject matter; and
    provides said answer information from said first information site to said communication device.

15. The computer server as recited in claim 14, wherein said advertiser information comprises sponsored information.

16. The computer server as recited in claim 15, wherein said sponsored information is sponsored for specific geographic locations.

17. The computer server as recited in claim 14, wherein the processor determines said particular geographic area for relevant information independent of a physical location of said communication device.

18. The computer server as recited in claim 17, wherein the processor determines said particular geographic area for relevant information from one of a network address identifying a geographic area of said communication device independent of a physical position of said communication device and geographic information supplied in said information request by a user of said communication device.

19. The computer server as recited in claim 17 wherein said geographic location of said communication device and location indicated by said geographic information provided by said user are different, and comprising a processor that provides, in said answer information, information corresponding to said geographic information supplied in said information request by said user.

20. The computer server as recited in claim 14, wherein the processor derives contextual information from said information request and providing in said answer information, advertiser information in at least one category correlated to said derived contextual information.

21. The computer server as recited in claim 20, wherein the processor assigns an exclusive advertiser information provider to each category for each answer to an information request.

22. The computer server as recited in claim 21, wherein the processor assigns an exclusive advertiser information provider to each said category until an event alters the identity of said exclusive advertiser information provider for said category.

23. The computer server as recited in claim 21, wherein the processor assigns an exclusive advertiser information provider to each said category for a time period.

24. The computer server as recited in claim 23, wherein the processor periodically auctions a right to be assigned as said exclusive sponsor.

25. A computer server that provides geographically based advertiser information to users of networked terminals, comprising:
  a processor that:
    creates a new first information site hosted by said computer server on a network, said first information site being characterized by a new network address, said network address relating to a particular subject matter;
    receives an information request from one of said users through a networked terminal, said information request relating to said particular subject matter;
    determines a particular geographic area for relevant information for said information request, wherein the particular geographic area for relevant information is determined from at least one of the communication device's derived geographic location, the communication device's location stored in memory, the communication device's network address, said information request, said particular subject matter, the input to the communication device being at least one of a selection on a displayed map, input of a postal code, and input of address information;

provides said user access to said first information site providing content responsive to said information request; and provides said user a link at said first information site to an advertiser's information site, an identity of said advertiser's information site being determined based on said particular subject matter in said particular geographic area for relevant information.

26. The computer server as recited in claim 25, wherein the processor provides a link to a first advertiser site for a first geographic location and a second advertiser information site for a second geographic location.

27. A computer server for communicating information over a network comprising:

means for creating a new first information site hosted by said computer server on said network, said first information site being characterized by a new network address, said network address relating to a particular subject matter;

means for receiving at said first information site an information request from a communications device connected through said network, said information request relating to said particular subject matter;

means for determining a particular geographic area for relevant information to be provided in answering said information request, wherein the particular geographic area for relevant information is determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;

means for retrieving answer information from one or more databases, said answer information comprising information responsive to said information request and advertiser information, said advertiser information being based on the determined particular geographic area for relevant information and containing a link to connect said communication device to an advertiser's information site relating to said particular subject matter; and means for providing said answer information from said first information site to said communication device.

28. The computer server as recited in claim 27, wherein said advertiser information comprises sponsored information.

29. The computer server as recited in claim 28, wherein said sponsored information is sponsored for specific geographic locations.

30. The computer server as recited in claim 27, further comprising means for determining said particular geographic area for relevant information independent of a physical location of said communication device.

31. The computer server as recited in claim 30, further comprising means for determining said particular geographic area for relevant information from one of a network address identifying a geographic area of said communication device independent of a physical position of said communication device and geographic information supplied in said information request by a user of said communication device.

32. The computer server as recited in claim 30, wherein said geographic location of said communication device and location indicated by said geographic information provided by said user are different, and comprising means for providing, in said answer information, information corresponding to said geographic information supplied in said information request by said user.

33. The computer server as recited in claim 30, further comprising means for deriving contextual information from said information request and providing in said answer advertiser information in at least one category correlated to said derived contextual information.

34. The computer server as recited in claim 33, further comprising means for assigning an exclusive advertiser information provider to each category for each answer to an information request.

35. The computer server comprising a processor as recited in claim 34, further comprising means for assigning an exclusive advertiser information provider to each said category until an event alters the identity of said exclusive advertiser information provider for said category.

36. The computer server as recited in claim 34, further comprising means for assigning an exclusive advertiser information provider to each said category for a time period.

37. The computer server as recited in claim 34 comprising means for periodically auctioning a right to be assigned as said exclusive advertiser information provider.

38. A computer server that provides geographically based advertiser information to users of networked terminals, comprising:

means for creating a new first information site hosted by the computer server on a network, said first information site being characterized by a new network address, said network address relating to a particular subject matter;

means for receiving an information request from one of said users through a networked terminal, said information request relating to said particular subject matter;

means for determining a particular geographic area for relevant information for said information request, wherein the particular geographic area for relevant information is determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;

means for providing said user access to said first information site providing content responsive to said information request; and means for providing said user a link at said first information site to an advertiser's information site, an identity of said advertiser's information site being determined based on said particular subject matter and said particular geographic area for relevant information.

39. The computer server as recited in claim 38, further comprising means for providing a link to a first advertiser site for a first geographic location and a second advertiser information site for a second geographic location.

40. A method of electronically providing information to a communication device comprising the steps of:

creating a new first information site hosted by a computer server on a network, said first information site being characterized by a new network address, said network address relating to a particular subject matter;

receiving at said first information site an information request from said communication device communicating through said network, said information request relating to said particular subject matter;

directing said computer to determine a particular geographic area for relevant information to be provided in answering said information request, wherein the particular geographic area for relevant information is determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;

directing said computer to retrieve answer information from one or more databases, said answer information comprising information responsive to said information request and advertiser information, said advertiser information being based on the determined particular geographic area for relevant information and containing a link for use by said communication device to connect said communication device to the advertiser's information site relating to said particular subject matter; and directing said computer to provide said answer information from said first information site to said communication device.

41. The method recited in claim 40, wherein said advertiser information comprises sponsored information.

42. The method recited in claim 41, wherein said sponsored information is sponsored for specific geographic locations.

43. The method recited in claim 40, further comprising directing said computer to determine said particular geographic area for relevant information independent of a physical location of said communication device.

44. The method recited in claim 43, further comprising directing said computer to determine said particular geographic area for relevant information from one of a network address identifying a geographic area of said communication device independent of a physical position of said communication device and geographic information supplied in said information request by a user of said communication device.

45. The method recited in claim 43, wherein said geographic location of said communication device and location indicated by said geographic information provided by said user are different, comprising directing said computer to provide answer information corresponding to said geographic information supplied in said information request by said user.

46. The method recited in claim 40, further comprising directing said computer to derive contextual information from said information request and to provide in said answer information, advertiser information in at least one category correlated to said contextual information.

47. The method recited in claim 46, further comprising directing said computer to assign an exclusive advertiser information provider to each said category for each answer to an information request.

48. The method recited in claim 47, further comprising directing said computer to assign an exclusive advertiser information provider to each said category until an event alters the identity of said exclusive advertiser information provider for said category.

49. The method recited in claim 47, further comprising directing said computer to assign an exclusive advertiser information provider to each said category for a time period.

50. The method recited in claim 47, further comprising directing said computer to periodically auction a right to be assigned as said exclusive advertiser information provider.

51. A method of providing geographically based advertiser information to users of networked terminals, comprising the steps of:

creating a new first information site hosted by a computer server on a network, said first information site being characterized by a new network address, said network address relating to a particular subject matter;

receiving at said computer server an information request from one of said users through a networked terminal, said information request relating to said particular subject matter;

determining with said computer server a particular geographic area for relevant information for said information request, wherein the particular geographic area for relevant information is determined from at least one of the communication device's derived geographic location, the communication device's location stored in memory, the communication device's network address, said information request, said information request, said particular subject matter, the input to the communication device being at least one of a selection on a displayed map, input of a postal code, and input of address information;

through said server providing said user access to said information site providing content responsive to said information request; and through said server providing said user a link at said information site to an advertiser's information site, an identity of said advertiser's information site being determined based on said particular subject matter and said particular geographic area for relevant information.

52. The method recited in claim 51, wherein said computer server provides a link to a first advertiser information site for a first geographic location and a second advertiser information site for a second geographic location.

53. A method of providing advertisers access to customers based on customer geographic preferences comprising the steps of:

providing a new first information site platform hosted by a computer server on a network and being characterized by a new network address at which customers seek information relating to a particular subject matter and a one or more particular geographic areas for relevant information, wherein the plurality of particular geographic areas for relevant information are determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;

for said plurality of particular geographic areas for relevant information, offering advertisers an option to purchase a link to be placed on said first information site platform to an advertiser information site, said advertiser site being based on the plurality of particular geographic areas for relevant information and relating to the particular subject matter; and placing said link on said first information site platform when purchased by said advertiser.

54. A method of advertising comprising:

creating a new first information site hosted by a computer server on a network, said first information site being characterized by a new network address, said network address relating to a particular subject matter;

receiving a request message from a communication device on said network, said request message relating to a particular subject matter;

determining a particular geographic area for relevant information from said request message, wherein the particular geographic area for relevant information is determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;

answering said request message by providing said communication device access to said first information site presenting request responsive information corresponding to said particular geographic area for relevant information; and providing a link on said first information site to an advertising site being based on the determined particular geographic area for relevant information and relating to the particular subject matter.

55. A method of providing advertisers access to customers based on customer geographic preferences comprising the steps of:

providing a new first information site platform hosted by a server on a network and being characterized by a new network address, at which customers seek information relating to particular subject matter and a plurality of particular geographic areas for relevant information, wherein the plurality of particular geographic areas for relevant information are determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;

for said plurality of particular geographic areas for relevant information, offering advertisers an option to purchase a link to be placed on said first information site platform to the advertiser's information site, said advertiser's information site having a relationship to said particular subject matter and said plurality of particular geographic areas for relevant information; and placing said link on said first information site platform when purchased by said advertiser.

56. A computer readable information storage medium having program code stored thereon that, when executed by a computer on a network, communicates information over said network comprising:

program code to create a new first information site hosted by said computer on said network, said first information site being characterized by a new network address, said network address relating to a particular subject matter;

program code that receives at said first information site on said network an information request from a communications device connected through said network, said information request relating to a particular subject matter;

program code that determines a particular geographic area for relevant information to be provided in answering said information request, wherein the particular geographic area for relevant information is determined from at least one of the communication device's derived geographic location, the communication device's location stored in memory, the communication device's network address, said information request, said particular subject matter, and an input to the communication device, the input to the communication device being at least one of a selection on a displayed map, input of a postal code, and input of address information;

program code that retrieves answer information from one or more databases, said answer information comprising information responsive to said information request and advertiser information, said advertiser information being based on the determined particular geographic area for relevant information and relating to the particular subject matter and containing information usable by a user to contact said advertiser; and program code that provides said answer information from said first information site to said communication device.

* * * * *